Patented Dec. 30, 1924.

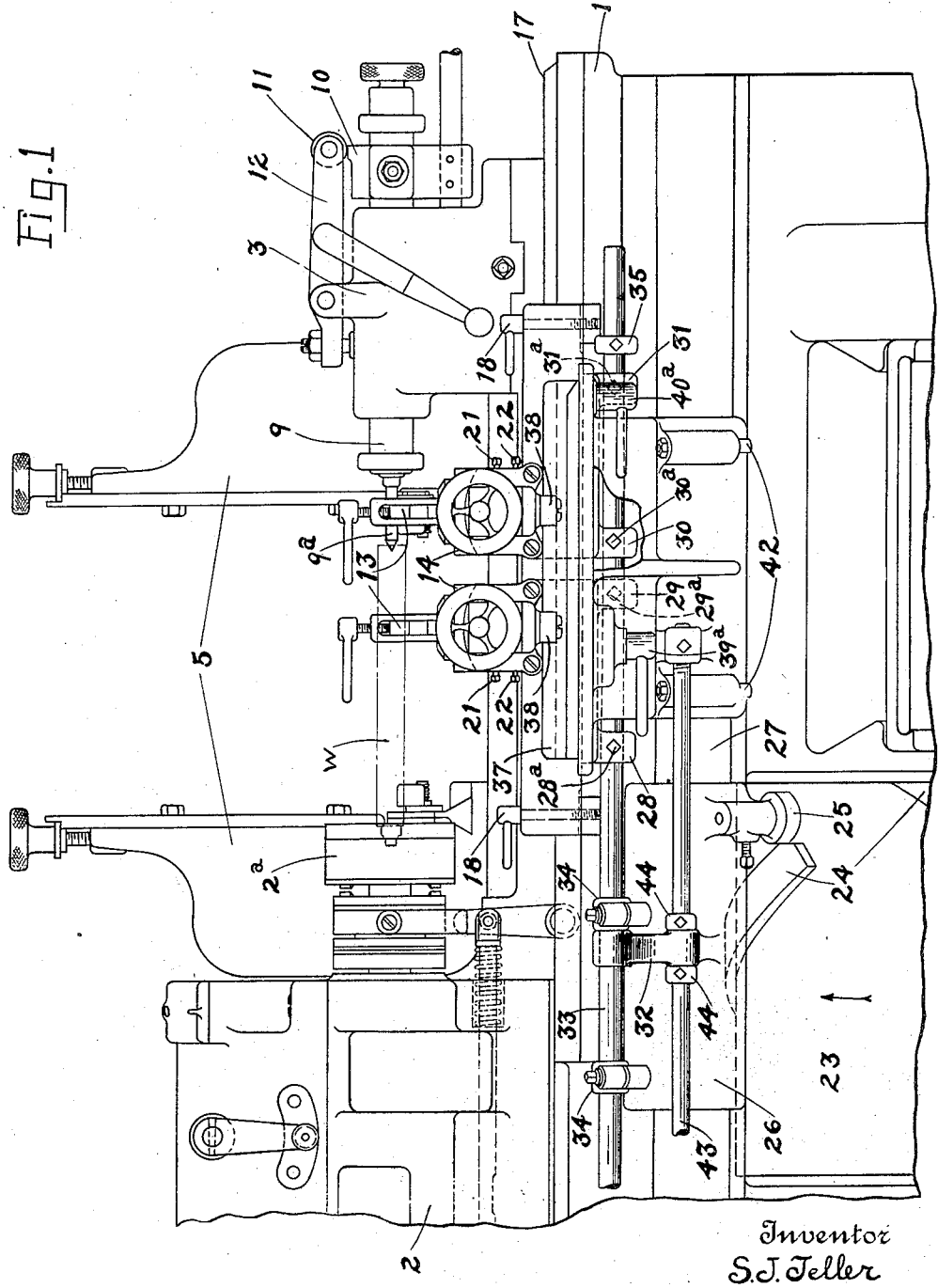

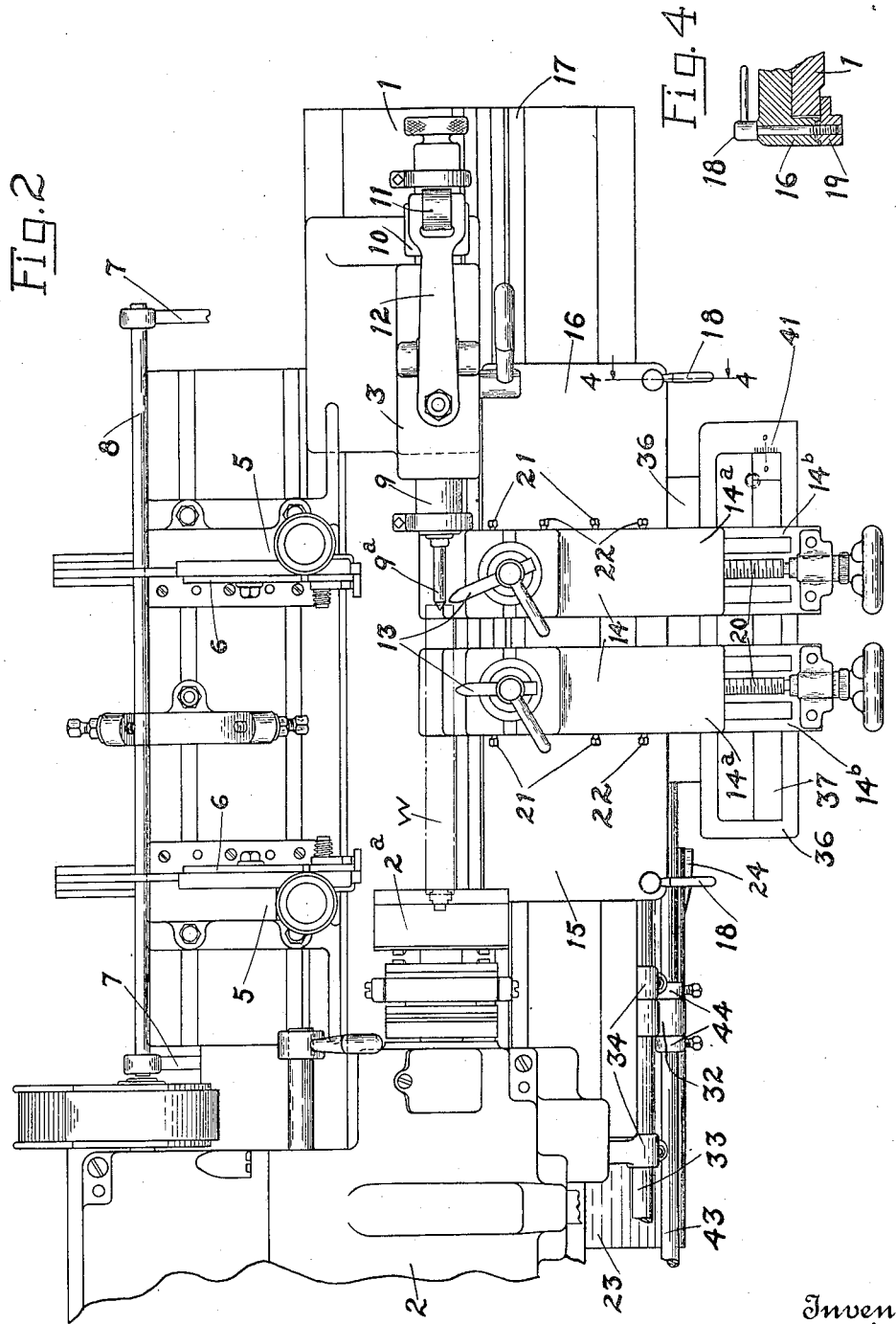

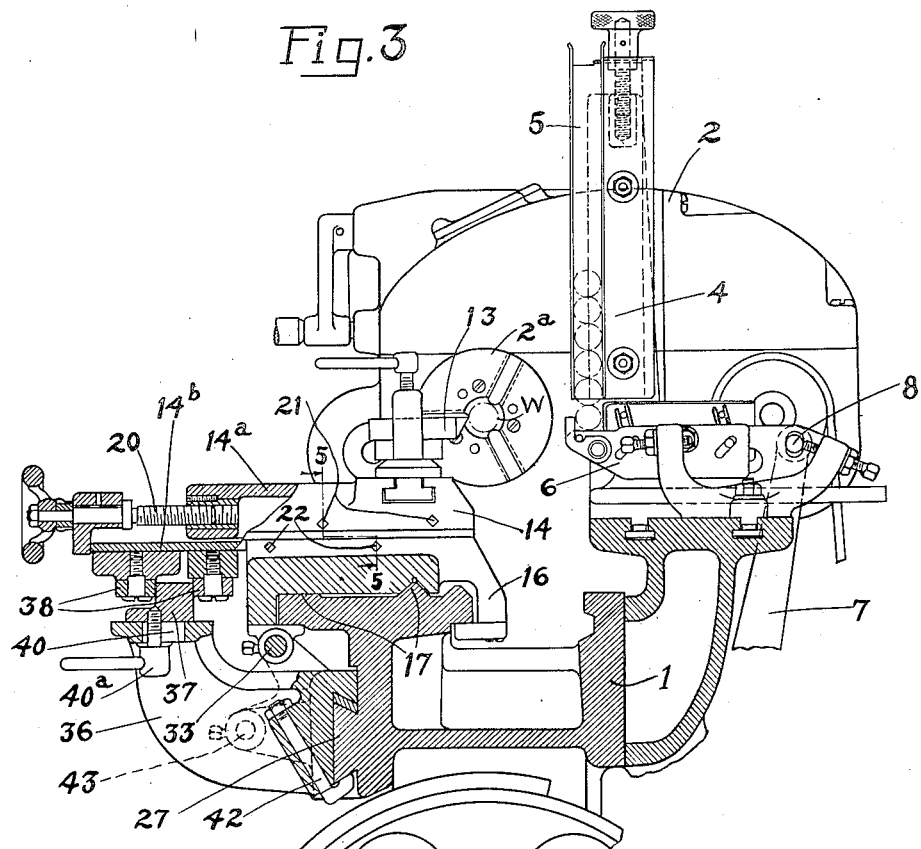
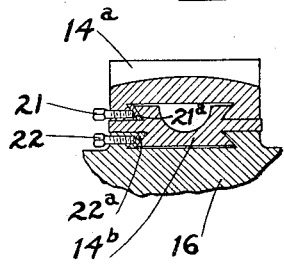
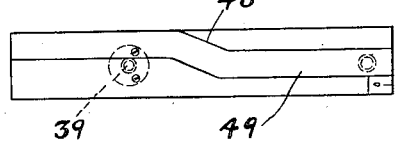

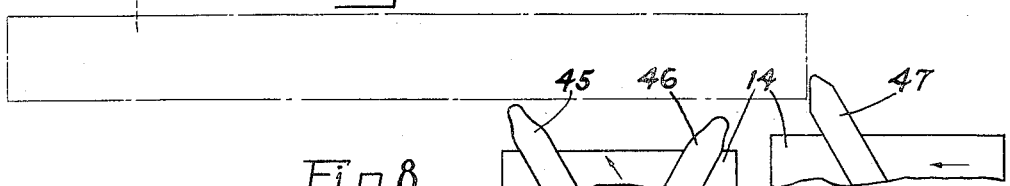
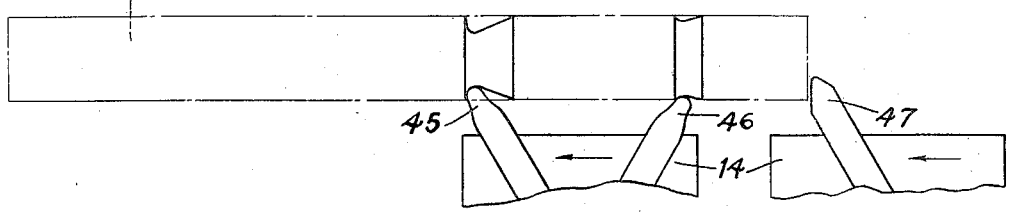
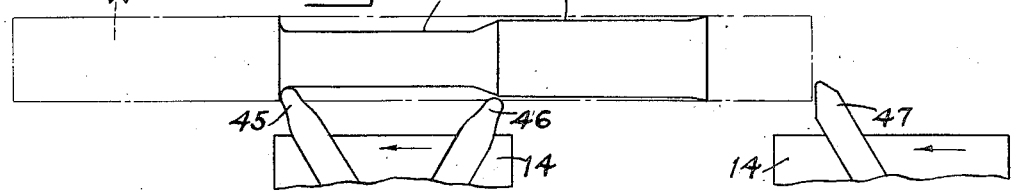
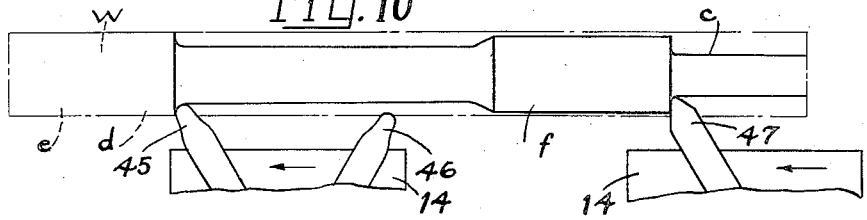
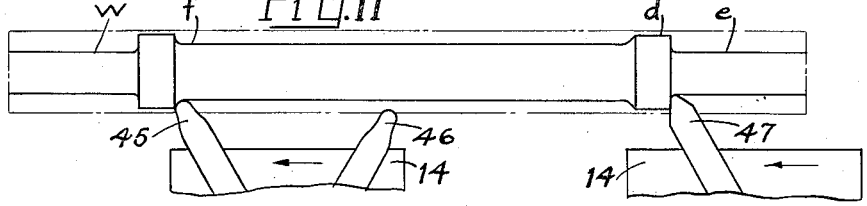
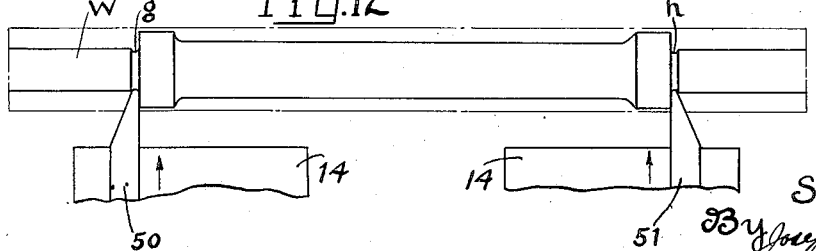

1,521,340

UNITED STATES PATENT OFFICE.

SPENCER JAY TELLER, OF HARTFORD, CONNECTICUT, ASSIGNOR TO PRATT & WHITNEY COMPANY, OF NEW YORK, N. Y., A CORPORATION OF NEW JERSEY.

AUTOMATIC LATHE.

Application filed March 21, 1921. Serial No. 454,156.

*To all whom it may concern:*

Be it known that I, SPENCER JAY TELLER, a citizen of the United States, residing at Hartford, in the county of Hartford and State of Connecticut, have invented certain new and useful Improvements in Automatic Lathes, of which the following is a specification.

This invention relates to lathes and particularly to the tool controlling and operating mechanism therefor. It is the primary object of the invention to provide a plurality of tool supporting slides and improved mechanism for selectively giving the same any one, or a combination, of a variety of movements, such mechanism being particularly applicable to automatic lathes of the type described in the patent to Müller 1,252,-928, granted January 8th, 1918.

More specifically the object of the invention resides in providing a plurality of tool carriages and slides and improved and simple automatic means for moving one or more of the tool carriages longitudinally of the machine or one or more of the tool slides transversely of the machine, such means comprising mechanism whereby these several movements may be selectively combined to give a plurality of relative movements to the tools.

Another object of the invention resides in the novel means for moving the tool slides transversely, such means comprising a taper bar mounted on the machine and adapted to be secured thereto or to be moved along with the carriages.

Other and more specific objects of the invention will appear as the description proceeds.

Referring to the figures of the drawings:

Figure 1 is a partial front elevation of an automatic lathe showing the present invention embodied therein.

Fig. 2 is a plan view thereof.

Fig. 3 is a vertical transverse sectional view through the same.

Fig. 4 is a detail sectional view of the carriage clamp taken on line 4—4 of Fig. 2.

Fig. 5 is a detail sectional view of the tool slide clamping means taken on line 5—5 of Fig. 3.

Fig. 6 is a detail plan view showing a modified form of taper bar.

Figs. 7 to 10 are diagrammatic views showing four steps of one turning operation performed on a piece of work.

Fig. 11 is a diagrammatic view showing the same piece of work reversed and another step in the operation thereon as being performed by the same tools.

Fig. 12 is a diagrammatic view showing the finishing of the piece by another set of tools.

In its entirety my invention comprises an automatic machine of the lathe type in which the piece or blank to be operated upon is held between live and dead centers and is rotated by means of a driving chuck. Generally, the machine comprises a bed which has mounted thereon at one end a headstock and at the other end a tailstock, the tailstock being operated by a suitable cam so as to engage the blank worked upon at a predetermined pressure and serving to clamp the dead or tailstock center securely in place to hold the blank on the centers. At the rear of the bed of the machine a suitable magazine is provided for holding a number of blanks or pieces preparatory to being worked upon and also means for transferring or carrying one of the blanks from its position at the lower end of the magazine to its operative position between the centers of the lathe.

In automatic lathes it is often desirable to perform turning operations with a plurality of tools moving different distances over the work and fed in different directions relative thereto. The present invention aims to provide supports for a plurality of tools and means for moving such supports to feed the tools in the desired direction and to the desired extent relative to the work. As illustrated in the drawings, such supports preferably comprise a plurality of tool carriages on each of which is mounted a tool slide, the carriages and slides being respectively movable longitudinally and transversely of the machine. Automatic means is provided for giving the carriages and slides the desired movements and combinations of movements to perform various kinds of work. This mechanism will now be described by reference to the drawings.

1 illustrates the bed of a lathe on which is mounted a headstock 2 and a tailstock 3 showing as rotatably supporting a piece of work W in a chuck 2ª. The work is adapted to be fed to the machine from a magazine 4. The magazine preferably comprises a pair of blank supporting uprights 5 longitudinally adjustable along the bed 1 to support blanks of different lengths. A pair of blank carriers 6 are adapted to slide beneath the magazine to carry a blank from the magazine to the work-supporting centers, levers 7 connected to the carrier through a rod 8 and operated from a suitable cam being provided for performing this function. The tailstock is adapted to be operated automatically in synchronism with the operation of the magazine mechanism. The sleeve 9 of the tailstock is brought forward to engage the center $9^a$ with the work at the proper time and the movement of the cam member 10 under the roller 11 operates the lever 12 to automatically clamp the sleeve and the center against the work, such mechanism being fully described in the aforesaid patent to Müller. These mechanisms within themselves comprise no part of the present invention and, therefore, will not be further described herein, it being understood, however, that the present invention now to be fully described is adapted to be operated automatically in combination and in synchronism with the said mechanisms. Reference to application No. 381,945 to J. J. Thacher, filed May 17th, 1920, which discloses a mechanism similar in many respects to the lathe illustrated herein, should be had for a clear disclosure of the mechanism not disclosed in detail herein.

Tools 13 are mounted on slides 14 in such a manner as to provide either transverse or longitudinal movement of such tools. I preferably mount the slides for transverse movement on separate carriages 15 and 16 longitudinally movable on ways 17 of the bed each carriage being adapted to be secured to the bed by means of a clamping screw 18 threadedly engaging a clamping member 19 (Fig. 4). The upper portion $14^a$ of each slide is transversely adjustable by means of a screw 20 journaled in the lower portion $14^b$ of the slide and screw threaded in the portion $14^a$ thereof. Clamping screws 21 are adapted to engage against a gib $21^a$ to secure the upper portion $14^a$ of the slide to the lower portion $14^b$ thereof. Clamping screws 22 are adapted to engage against a gib $22^a$ to secure each slide to its carriage.

The carriages receive their reciprocating movement longitudinally from a rotary cam drum 23 on which are a pair of spirally arranged cam plates 24. A roller 25 mounted on a member 26 slidable on a guideway 27 is adapted to ride against these cam plates. Continuous rotation of the drum reciprocates the member 26 through a constant distance longitudinally. Extending longitudinally of the bed and through projections 28, 29, 30 and 31 on the carriages and through a driver 32 on the member 26 is a rod 33.

The carriages may be secured to the rod by means of screws $28^a$, $29^a$, $30^a$ and $31^a$ and collars 34 adjustable on the rod at opposite sides of the driver 32 provide means for giving the rod all or any part of the movement of the member 26. A third collar 35 is adjustably mounted on the end of the rod to engage and move the carriage 16 as will be hereinafter described.

Means comprising a taper bar 37 mounted in a novel manner is provided for moving the tool slides transversely. A bracket 36 mounted on the guideway 27 supports the taper bar 37 between a pair of rollers 38 on each tool slide 14. The bar may be adjusted about a pivot 39 and through a slot 40 to different angular positions indicated by a scale 41 and secured therein by means of clamping screws $39^a$ and $40^a$. A pair of clamping screws 42 are provided for securing the taper bar and its supporting bracket against longitudinal movement on the guideway 27. A rod 43 is secured to the bracket 36 and extends through the driver 32, and two collars 44, adjustable on the rod at each side of the driver, provide means for reciprocating the taper bar with the driver and carriages when desired.

With the mechanism described, it will be seen that by making certain adjustments, the tools may be given various movements to perform the desired operations on the work. The following are cited as being some of the adjustments and operations which may be performed.

By tightening the screws $28^a$, $29^a$, $30^a$ and $31^a$ to the rod 33 and setting both collars 34 directly against the driver 32, both carriages may be given a reciprocation equal to the full stroke of the driver 32. By spacing the collars 34 from the driver 32, as illustrated in Fig. 1, the reciprocation given to the carriages may be shortened as desired. With the taper bar 37 set at zero, as in Fig. 2, no movement will be given to the tool slides transversely upon the longitudinal reciprocation of the carriages. Also either the taper bar or the rollers 38 may be removed, if desired, to prevent any transverse movements of the tool slides. If it is desired to feed only one slide transversely, the rollers 38 may be removed from the other slide whereupon such slide will not be effected by the movement of the taper bar. If it is desired to reciprocate only one carriage, the other carriage may be released from the bar 33.

By securing the bracket 36 against longitudinal movement on the guideway 27, by means of clamping screws 42, the collars 44 being spaced from engagement with the driver 32, and setting the taper bar at an angle to the horizontal line of movement of the carriages, a transverse movement is given the tool slides through the rollers 38 as the carriages are reciprocated longitudinally. Such operation is used to effect taper turning and may be performed with one or both slides.

By clamping one carriage against movement on the bed and the other carriage to the rod 33, the collars 44 being adjusted to move the bracket 36 and taper bar with the movable carriage, the free carriage may be moved longitudinally and the tool slide of the other carriage moved transversely toward and from the work.

By clamping both carriages against movement on the bed, the collars 44 being adjusted to move the bracket 36 and taper bar with the driver 32, both tool slides may be moved transversely toward and from the work.

By clamping the carriage 15 to the rod and spacing the collar 35 from the carriage 16, as illustrated in Fig. 1, the carriage 15 will move with the rod 33 but movement of the carriage 16 will be delayed until the collar 35 comes into contact therewith. The collars 34 may be set, as illustrated in Fig. 1, to start the movement of the carriage 15 after a desired idle movement of the driver 32 if desired.

In Figs. 7 to 10 of the drawings, I have illustrated a series of steps of an operation performed on a piece of work W with the mechanism adjusted to the positions last described. Two tools 45 and 46 are illustrated as being supported by the tool slide 14 on the carriage 15, and one tool 47 as being supported by the tool slide 14 on the carriage 16. The starting position of the tools is illustrated in Fig. 7. As the driver 32 engages the collar 34 and moves the carriage 15 toward the left, the inclined portion 48 of the taper bar 49, illustrated in Fig. 6, engages a roller 38 to move the tools 45 and 46 into the work, as illustrated in Fig. 8. The continued movement of the carriage 15 moves the tools 45 and 46 along the work to turn the same at $a$ and $b$ respectively, Fig. 9. As the collar 35 engages the carriage 16, the tool 47 is moved along the work with the tools 45 and 46 and turns the work at $c$.

For the next step in the operation on the work illustrated, the pieces shown in Fig. 10 are placed in the magazine 4 and fed therefrom in a reversed position, end to end, from that shown in Figs. 7 to 10. This step in the operation comprises the turning of the piece at $d$, $e$ and $f$ by the tools 46, 45 and 47 as the carriages are moved from the position illustrated in Fig. 7 to the position illustrated in Figs. 10 and 11.

The work pieces shown in Fig. 11 are then again placed in the magazine 4 and fed therefrom to the tools 50 and 51 which are substituted for the tools 45, 46 and 47. For this operation, the tool carriages 15 and 16 are secured to the bed of the machine and the collars 44 are adjusted on the rod 43 to give the taper bar a longitudinal movement whereby the tools are fed transversely into the work to cut the grooves $g$ and $h$, as illustrated in Fig. 12. The extent of this transverse feeding movement of the tools is controlled by the adjustment of the taper bar as indicated on the scale 41 and by the adjustment of the collars 44.

Figs. 7 to 12 inclusive illustrate some of the operations which may be performed on the machine comprising my invention and it will be readily understood that various other operations may be performed simply by adjusting the several mechanisms as described.

What I claim is:

1. A lathe comprising in combination, a bed, means thereon for supporting and rotating a blank, two tool carriages mounted for longitudinal movement on the bed, and automatic means including a single rotary cam and cam follower for moving one carriage through a desired distance and the other carriage through the same or a desired less distance longitudinally of the bed.

2. A lathe comprising in combination, a bed, means thereon for supporting and rotating a blank, a guideway extending longitudinally along the bed at one side of the said means, two tool carriages slidably mounted on the guideway, a rotary cam, and means operated from the cam for moving one carriage through a desired distance on the guideway and for moving the other carriage therewith through the same or a desired less distance.

3. A lathe comprising in combination, a bed, means thereon for supporting and rotating a blank, a guideway extending longitudinally along the bed at one side of the said means, two tool carriages slidably mounted on the guideway, a rotary cam, and a rod reciprocated longitudinally from the cam for moving the carriages as a unit or for moving one carriage a desired distance on the guideway and the other carriage a less distance.

4. A lathe comprising in combination, a bed, means thereon for supporting and rotating a blank, two tool carriages mounted for longitudinal movement on the bed at one side of the said means, a rod extending longitudinally of the bed, means for connecting either or both carriages to the rod, a pair of collars adjustably mounted on the rod, a driver between the collars, and means for automatically reciprocating the driver longitudinally of the rod.

5. A lathe comprising in combination, a bed, means thereon for supporting and rotating a blank, two tool carriages mounted for longitudinal movement on the bed, a tool slide mounted to slide transversely on each carriage, and automatic means including a single rotary cam for selectively moving the tool carriages longitudinally and the tool slides transversely.

6. A lathe comprising in combination, a bed, means thereon for supporting and rotating a blank, two tool carriages mounted for longitudinal movement on the bed, a tool slide mounted to slide transversely on each carriage, and automatic means including a single rotary cam for moving the tool carriages longitudinally, simultaneously or independently, and either or both tool slides transversely either during the movement of its carriage or while the same is at rest.

7. A lathe comprising in combination, a bed, means thereon for supporting and rotating a blank, two tool carriages mounted for longitudinal movement on the bed at one side of the said means, a tool slide mounted to slide transversely on each carriage, and longitudinally movable means extending longitudinally of the bed for selectively and simultaneously moving either carriage longitudinally and the tool slide of the other carriage transversely.

8. A lathe comprising in combination, a bed, means thereon for supporting and rotating a blank, two tool carriages mounted for longitudinal movement on the bed at one side of the said means, a tool slide mounted to slide transversely on each carriage, and longitudinally movable means extending longitudinally of the bed for moving one carriage longitudinally and simultaneously moving either slide transversely.

9. A lathe comprising in combination, a bed, means thereon for supporting and rotating a blank, two tool carriages mounted for longitudinal movement on the bed at one side of the said means, a tool slide mounted to slide transversely on each carriage, and longitudinally movable means extending longitudinally of the bed for moving both carriages longitudinally and for simultaneously moving the slides transversely.

10. A lathe comprising in combination, a bed, means thereon for supporting and rotating a blank, two tool carriages mounted for longitudinal movement on the bed at one side of the said means, a tool slide mounted to slide transversely on each carriage, and longitudinally movable means extending longitudinally of the bed for selectively moving the carriages longitudinally or the tool slides transversely.

11. A lathe comprising in combination, a bed, means thereon for supporting and rotating a blank, two tool carriages mounted for longitudinal movement on the bed at one side of the said means, a tool slide mounted to slide transversely on each carriage, and longitudinally movable means extending longitudinally of the bed for selectively moving the tool slides transversely in the same direction.

12. A lathe comprising in combination, a bed, means thereon for supporting and rotating a blank, two tool carriages mounted for longitudinal movement on the bed at one side of the said means, a tool slide mounted to slide transversely on each carriage, and longitudinally movable means extending longitudinally of the bed for moving the tool slides transversely in the same direction either with the carriages stationary or selectively in combination with the longitudinal movement of the carriages.

13. A lathe comprising in combination, a bed, means thereon for supporting and rotating a blank, two tool carriages mounted for longitudinal movement on the bed, a tool slide mounted to slide transversely on each carriage, a taper bar mounted for longitudinal movement on the bed and operatively connected to one of the tool slides to move the same transversely, means for securing the taper bar to the bed against longitudinal movement, means for moving one carriage longitudinally, and means whereby the taper bar may be moved along with the carriage.

14. A lathe comprising in combination, a bed, means thereon for supporting and rotating a blank, two tool carriages mounted for longitudinal movement on the bed, a tool slide mounted to slide transversely on each carriage, a taper bar mounted for longitudinal movement on the bed and operatively connected to the tool slides, means for securing the taper bar to the bed against longitudinal movement, means for selectively moving the carriages longitudinally, and means whereby the taper bar may be selectively moved along with the carriages.

15. A lathe comprising in combination, a bed, means thereon for supporting and rotating a blank, two tool carriages mounted for longitudinal movement on the bed, a tool slide mounted to slide transversely on each carriage, a taper bar mounted for longitudinal movement on the bed and operatively connected to the tool slides, means for securing the taper bar to the bed against longitudinal movement, means for selectively moving the carriages longitudinally, and means whereby the taper bar may be selectively moved along with the carriages through a desired portion of the movement thereof.

16. A lathe comprising in combination, a bed, means thereon for supporting and rotating a blank, two tool carriages mounted for longitudinal movement on the bed, a rod extending longitudinally of the bed, means for selectively securing the carriages to the rod, a driver adapted in operation to be reciprocated always through the same longitudinal distance, and adjustable collars on the rod adapted to be engaged by the driver.

17. A lathe comprising in combination, a bed, means thereon for supporting and rotating a blank, two tool carriages mounted for longitudinal movement on the bed, a rod extending longitudinally of the bed, means for selectively securing the carriages to the rod, a driver adapted in operation to be reciprocated always through the same longitudinal distance, adjustable collars on the rod adapted to be engaged by the driver, and another collar adjustably mounted on the rod adjacent one of the carriages for engaging the said carriage to move the same longitudinally after the rod has been moved sufficiently to bring such collar against the carriage.

18. A lathe comprising in combination, a bed, means thereon for supporting and rotating a blank, two tool carriages mounted for longitudinal movement on the bed, a rod extending longitudinally of the bed, means for selectively securing the carriages to the rod, a tool slide mounted to slide transversely on each carriage, a taper bar mounted for longitudinal movement on the bed and operatively connected to the tool slides, a rod secured to the taper bar and extending longitudinally of the bed, a driver adapted in operation to be reciprocated always through the same longitudinal distance, and adjustable collars on each of the said rods adapted to be engaged by the driver.

19. In a lathe, the combination of a bed having ways extending longitudinally therealong, means on the bed for supporting and rotating a blank parallel with the ways, a tool carriage on the ways, a tool slide movable transversely on the carriage, a templet and cooperating means for so moving the tool slide on the carriage as the templet is moved lineally relative to the carriage, and power operated means for automatically giving the templet and carriage various combinations of movements.

20. In a lathe, the combination of a bed having ways extending longitudinally therealong, means on the bed for supporting and rotating a blank parallel with the ways, a tool carriage on the ways, a tool slide movable transversely on the carriage, a templet and cooperating means for so moving the tool slide on the carriage as the templet is moved lineally relative to the carriage, and power operated means for automatically giving the templet and carriage various combinations of relative and unitary movements.

21. In a lathe, the combination of a bed having ways extending longitudinally therealong, means on the bed for supporting and rotating a blank parallel with the ways, a tool carriage on the ways, a tool slide movable transversely on the carriage, a templet and cooperating means for so moving the tool slide on the carriage as the templet is moved lineally relative to the carriage, power means, and operative connections from the power means to the templet and carriage respectively, certain of said connections being adjustable to provide lost motion therein whereby the templet and carriage can be given various combinations of movements by the power means.

22. In a lathe, the combination of a bed having ways extending longitudinally therealong, means on the bed for supporting and rotating a blank parallel with the ways, a tool carriage on the ways, a tool slide movable transversely on the carriage, a templet and cooperating means for so moving the tool slide on the carriage as the templet is moved relative to the carriage, a reciprocatory member, means providing adjustable connections between the member and the templet and carriage respectively whereby various combinations of movements can be imparted to the templet and carriage, and means for reciprocating the member.

23. In a lathe, the combination of a bed having ways extending longitudinally therealong, means on the bed for supporting and rotating a blank parallel with the ways, a tool carriage on the ways, a tool slide movable transversely on the carriage, a templet and cooperating means for so moving the tool slide on the carriage as the templet is moved relative to the carriage, a reciprocatory member, means providing operative connections between the member and the templet and carriage respectively, one of the connections being adjustable to provide lost motion therein, and means for reciprocating the member.

24. In a lathe, the combination of a bed having ways extending longitudinally therealong, means on the bed for supporting and rotating a blank parallel with the ways, a tool carriage on the ways, a tool slide movable transversely on the carriage, a templet and cooperating means for so moving the tool slide on the carriage as the templet is moved relative to the carriage, a reciprocatory member, adjustable means providing lost motion connections between the member and the templet and carriage respectively whereby various combinations of movements can be imparted to the templet and carriage, and means for reciprocating the member.

25. In a lathe, the combination of a bed having ways extending longitudinally therealong, means on the bed for supporting and rotating a blank parallel with the ways, a tool carriage on the ways, a tool slide movable transversely on the carriage, a templet and cooperating means for so moving the tool slide on the carriage as the templet is moved relative to the carriage, a reciprocatory member, a rod for connecting the templet to the member, a second rod for connecting the carriage to the member, certain of such connections being adjustable to provide lost motion therein, and cam means for reciprocating the member.

26. In a lathe, the combination of a bed having ways extending longitudinally therealong, means on the bed for supporting and rotating a blank parallel with the ways, a tool carriage on the ways, a tool slide movable transversely on the carriage, a cam drum, and means operated by the drum for first moving the tool slide inwardly relative to the carriage a predetermined amount to engage the tool with the work and thereafter moving the carriage on the ways.

27. In a lathe, the combination of a bed having ways extending longitudinally therealong, means on the bed for supporting and rotating a blank parallel with the ways, a tool crriage on the ways, a tool slide movble transversely on the carriage, a reciprocatory member, means operated by the member for first moving the tool slide inwardly a predetermined amount to engage the tool with the work and thereafter moving the carriage on the ways, and means for reciprocating the member.

28. In a lathe, the combination of a bed having ways extending longitudinally therealong, means on the bed for supporting and rotating a blank parallel with the ways, a tool carriage on the ways, a tool slide movable transversely on the carriage, a templet and cooperating means for moving the tool slide inwardly to operatively engage the work as the templet is moved in one direction relative to the carriage, and means for so moving the templet a predetermined amount and thereafter moving the templet and carriage as a unit.

29. In a lathe, the combination of a bed having ways extending longitudinally therealong, means on the bed for supporting and rotating a blank parallel with the ways, a tool carriage on the ways, a tool slide movble transversely on the carriage, a templet and cooperating means for moving the tool slide inwardly to operatively engage the work as the templet is moved in one direction relative to the carriage, a reciprocatory member, means connecting the member with the templet and carriage whereby movement of the member in the said one direction first moves the templet to engage the tool with the work and thereafter moves the templet and carriage as a unit, movement of the member in the opposite direction being adapted to return the carriage and templet to their original positions and means for reciprocating the member.

30. In a lathe, the combination of a bed having ways extending longitudinally therealong, means on the bed for supporting and rotating a blank parallel with the ways, a tool carriage on the ways, a tool slide movable transversely on the carriage, a templet and cooperating means for moving the tool slide inwardly to operatively engage the work as the templet is moved in one direction relative to the carriage, a reciprocatory member, a rod connecting the templet to the member, a second rod for connecting the carriage to the member, means cooperating with the second rod for providing a lost motion connection between the member and carriage, and means for reciprocating the member, movement of the member in one direction being adapted to first move the templet to engage the tool with the work and thereafter moving the templet and carriage as a unit.

In testimony whereof, I hereto affix my signature.

S. JAY TELLER.